Oct. 4, 1960  H. H. GEBHART  2,954,651
ATTACHMENT FOR SURFACE GRINDERS
Filed Feb. 10, 1958  2 Sheets-Sheet 1

INVENTOR.
HERBERT H. GEBHART
BY Elliott & Pastoriza
ATTORNEYS

Oct. 4, 1960 H. H. GEBHART 2,954,651
ATTACHMENT FOR SURFACE GRINDERS
Filed Feb. 10, 1958 2 Sheets-Sheet 2

INVENTOR.
HERBERT H. GEBHART
BY *Elliott & Pastoriza*
ATTORNEYS

United States Patent Office 2,954,651
Patented Oct. 4, 1960

2,954,651
ATTACHMENT FOR SURFACE GRINDERS
Herbert H. Gebhart, 1685 Valley View Road,
Glendale, Calif.
Filed Feb. 10, 1958, Ser. No. 714,287
2 Claims. (Cl. 51—236)

This invention relates generally to machine tools and more particularly to a portable attachment apparatus for facilitating cylindrical grinding operations with surface grinders.

Surface grinding machines are in wide use in shops at the present time. In outside diameter grinding operations, some type of support apparatus is employed for holding a workpiece on which a surface grinding operation is to take place. Conventional surface grinders usually include a magnetic chuck for this purpose. Others simply provide a flat work table and jig for supporting a workpiece on which grinding operations are to take place. In the event a tapered workpiece is to be ground or polished, special gauge blocks and the like are used for positioning the workpiece at the desired angle to enable finishing of the taper. Jigs for supporting a workpiece in this manner are relatively complicated and entail considerable time and labor in their actual use. Further, surface grinders are generally among the most difficult of machines to maintain clean and free of dirt and grit. Accordingly, the jigs presently employed for supporting workpieces become clogged with grit and dirt resulting from the grinding operation.

Bearing the above in mind, it is a primary object of the present invention to provide a surface grinder attachment apparatus adapted to seat directly on the work table or magnetic chuck of a surface grinder and support a workpiece in a desired position for facilitating surface grinding operations.

More particularly, it is an object to provide an attachment device of the above type incorporating a built in micrometer which is easily adjusted to support a tapered workpiece at a desired angle.

Still another object is to provide an attachment device which is completely sealed throughout whereby grit and dirt are excluded from its working parts and thus there is provided a relatively maintenance-free instrument.

Still another important object of the invention is to provide a surface grinder attachment apparatus which includes a pair of dead centers mounted in opposing relationship whereby the concentricity of various pieces of work is always assured and the instrument itself becomes useful as a checkout and inspection device.

Other objects of the invention are to provide an improved attachment device which is lightweight and thus easily movable from one grinding machine to another, which requires little lubrication, and which includes an accurate indexing plate for holding a desired workpiece on the dead centers in a stationary position.

These and many other objects and advantages of the present invention are attained briefly by providing a single base plate adapted to seat on either the work table or magnetic chuck of a surface grinder. Above the base plate there is supported, normally in parallel relationship thereto, a sine plate. A built in micrometer mechanism is included in one of the supports between the base plate and the sine plate enabling extremely accurate angular orientation of the sine plate with respect to the base plate.

The sine plate supports head and tail stock bodies including first and second dead centers in opposing, aligned, relationship. Suitable guide bars enable the distance between the first and second dead centers to be varied. These guide bars are surrounded by neoprene type bellows sealed to the ends thereof to insure exclusive of grit and dirt.

A suitable motor and drive plate arrangement is secured to the head stock body and arranged to rotate a workpiece at preferably two different speeds as determined by a gear shift mechanism. The workpiece is rotated about the stationary dead centers by the driving plate through a dog drive. The built in micrometer may be used in cooperation with conventional gauge blocks so that a workpiece may be positioned through a very wide range of angles.

A better understanding of the invention and its various features and advantages will be had by referring to a preferred embodiment thereof as illustrated in the accompanying drawings in which.

Figure 1:
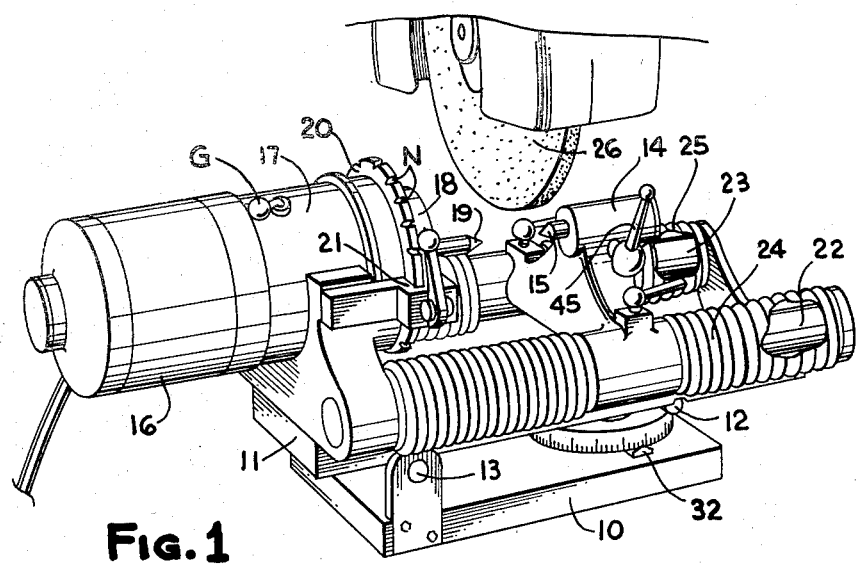
Figure 1 is a broken away perspective view of the surface grinder attachment.

Referring first to Figure 1, the apparatus comprises a base plate 10 adapted to seat on the work table or magnetic chuck of a conventional surface grinding machine. A sine plate 11 is supported above the base plate 10 normally in substantially parallel relationship thereto by means of a pair of sine bars 12 and 13 extending transversely under the sine plate 11 adjacent its ends. On the sine plate 11, there is supported a tail stock body 14 which includes a dead center 15. Also shown is a motor 16 secured to the rear end portion of a head stock body 17, including a driving plate 18 and a dead center 19 in opposing relationship to the dead center 15 on the tail stock body 14. An indexing plate 20 provided with suitable notches N arranged to be engaged by an index stop 21 is secured to the drive plate 18 so that any workpiece positioned between the dead centers 15 and 19 may be held in a desired position.

The distance between the tail stock body 14 and head stock body 17 may be varied by sliding the tail stock along two horizontal guide bars 22 and 23 positioned adjacent the longitudinal edges of the sine plate 11. As shown, these guide bars are completely enclosed in flexible bellows 24 and 25 so that grit, dirt, chips, and the like are excluded therefrom. The arrangement is such that a workpiece may be positioned between the dead centers 15 and 19 and caused to rotate by means of a suitable dog connection from the driving plate 18 about the stationary dead centers all as will become clearer as the description proceeds. Two rotational speeds are made available by the gear shift lever G. In Figure 1 there is shown a portion 26 of a surface grinder with which the attachment apparatus is used.

Figure 2:
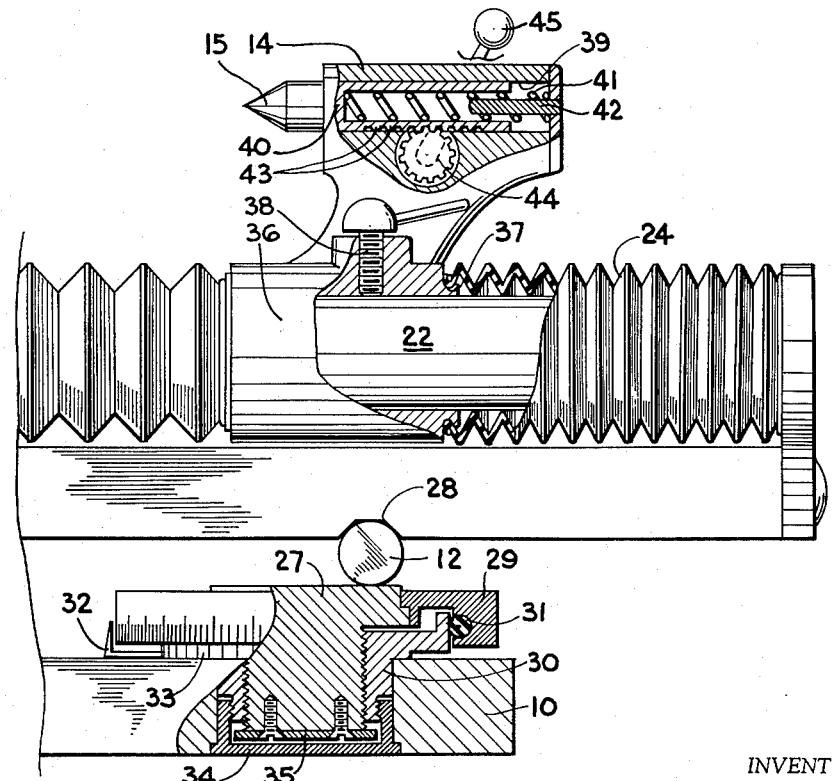
Figure 2 is an enlarged broken away elevational view of the micrometer mechanism and tail stock body portion of the device illustrated in Figure 1.

Referring now to Figure 2, the details of the tail stock body and mounting structure for the sine plate are shown. Referring first to the lower portion of Figure 2, it will be noted that the sine bar 12 is supported between the top surface of a micrometer screw anvil 27 and a transverse groove 28 running under the base plate 11. By this arrangement, suitable gauge blocks may be disposed between the surface of the anvil 27 and the sine bar 12 to vary the angle between the base plate 10 and sine plate 11.

Secured to the micrometer anvil 27 is an annular dial 29 sealed to a threaded bushing 30 as by O-ring seal 31. The bushing 30 threadedly receives the anvil screw 27 and a pointer 32 is provided juxtaposed the indicia on the dial 29 so that the degree of threading of the anvil by rotation of the dial will be indicated by the pointer. The pointer itself includes a ring section 33 which is movable, surrounding the bushing so that it may be set to zero after proper leveling of the sine plate in the event the table or magnetic chuck is not level. The bushing 30 is secured to the base plate 10 by a retaining nut 34. The bottom portion of the micrometer screw anvil 27, on the other hand, is provided with a stop plate 35 to limit the extent of unthreading of the same from the bushing. By this arrangement, the level of the anvil with respect to the base 10 can be varied in steps of .0001" over a range which corresponds to the thickness of available gauge blocks so that rough adjustments may be effected by conventional gauge blocks and fine adjustments effected by means of the micrometer dial.

Referring now to the upper portion of Figure 2, it will be noted that the tail stock body 14 includes laterally extending journal portions 36 for receiving the guide rods such as the guide rod 22. As shown clearly in Figure 2, the flexible bellows 24 is annularly sealed to the journaling portion 36 as at 37. A conventional set screw lock 38 is provided for fixing the position of the tail stock body to the guide rod.

The tail stock body itself includes an internal bore 39 receiving the main body portion 40 of the dead center 15. This body portion 40 is normally biased outwardly from the tail stock body by a spring 41 received in a recess and guided on spring guide 42. The lower surface of the body 40 is provided with rack teeth 43 arranged to mesh with a pinion 44 in turn rotatable through a retracting knob 45. By this construction, the dead center 15 may be retracted without moving the entire tail stock body whereby the insertion and removal of workpieces between the dead center 15 and the dead center 19 as illustrated in Figure 1 is facilitated.

Figure 3:
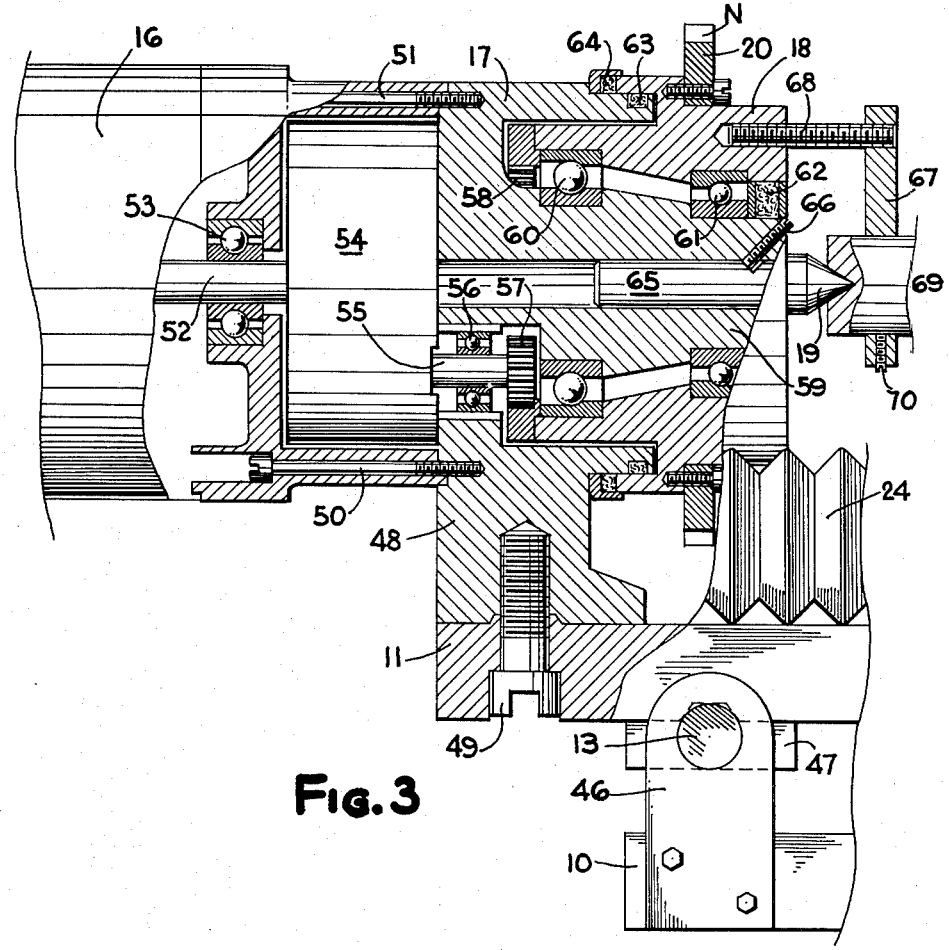
Figure 3 is another broken away elevational view of the head stock body portion illustrating the driving plate mechanism; and, Figure 4 is an elevational view showing the angular adjustment feature of the device.

In Figure 3, the details of the head stock body and driving plate are shown. Referring first to the lower portion of Figure 3, it will be noted that the sine bar 13 has its opposite ends journaled in suitable brackets such as the bracket 46 rigidly secured to the base plate 10. The sine bar 13 itself may be secured to the underside of the sine plate 11 as by retaining blocks such as 47 secured to the underside of the sine plate. The head stock body 17 includes a lower extending portion 48 arranged to seat on the rear of the sine plate 11 and be rigidly secured thereto as by retaining screw 49.

The head stock body 17 supports the motor 16 by screws 50 and 51. The shaft 52 for the motor passes through ball bearings 53 and connects into a gear casing 54. Gear casing 54 may include a conventional gear shift mechanism actuated by the lever G of Figure 1, coupled to an output shaft 55, non-concentric with respect to the motor shaft 52. The shaft 55 is supported by ball bearings 56 and terminates in a driving gear 57. Driving gear 57 in turn is arranged to mesh with an internal ring gear 58 secured to the inside rear portion of the driving plate 18. The forward end of the head stock body 17 includes a reduced diameter nose portion 59 which rotatably mounts the drive plate 18 through ball bearings 60 and 61. It will be evident, therefore, that the dead center 19, nose portion 59 of the head stock body 17, the outer bearing races for the bearings 56, and the inner bearing races for the bearings 60 and 61 are all stationary while the ring gear 58 and drive plate 18 are caused to rotate about the central axis of the dead center 19 when the drive gear 57 is rotated.

In order to exclude dirt and grit from the bearings between the drive plate 18 and reduced diameter nose portion 59, suitable annular seals 62, 63, and 64 are provided.

As shown clearly in Figure 3, the indexing plate 20 is secured directly to the driving plate 18 and thus when the indexing stop mechanism 21 of Figure 1 is inserted in any of the peripheral notches N of the indexing plate 20, the drive plate 18 is held in a stationary position.

The dead center 19 includes a body portion 65 extending centrally within the reduced diameter nose 59 and may be locked in position as by the set screw 66. A driving dog 67 may be secured to the drive plate 18 as by a drive screw 68. The other end of the dog 67 encircles a workpiece such as the cylindrical workpiece illustrated at 69 and is rigidly secured thereto by the set screw 70. With this arrangement, rotation of the drive plate 18 will rotate the driving screw 68 and dog 67 to rotate the work 69 about the stationary dead center 19.

Figure 4:
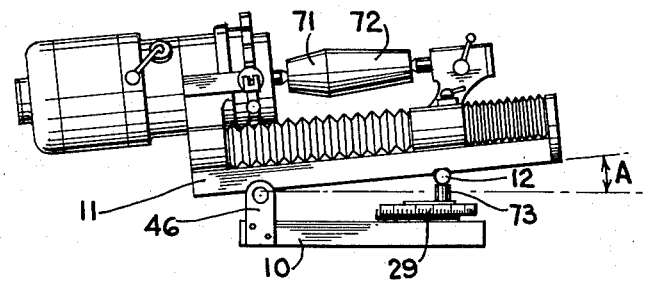

Figure 4 illustrates in greater detail the manner in which the micrometer dial 29 operates in co-operation with gauge blocks. As an example of the use of these adjustments, there is shown in Figure 4 a tapered workpiece 71 having a taper surface 72 of a given taper angle. To effect a surface grinding of the taper surface 72, it is desirable to position the axis of the work at the taper angle so that the surface to be ground will be level. To this end, if the taper angle is A, a gauge block 73 of thickness approximately equal to the sine of angle A times the distance between the sine bars 12 and 13 may be positioned between the micrometer anvil and the sine bar 12. The final adjustment of the angle between the sine plate 11 and base plate 10 may then be effected by rotating the micrometer dial 29 until the exact angle A is attained.

It will be immediately evident that the built in micrometer system just described may be employed for compensating for unlevel work tables or magnetic chucks. In other words, if there is any inclination of the work table or chuck with respect to the surface grinder, such may be compensated for by suitably adjusting the relative angular position of the sine plate 11 with respect to the base plate 10. The pointer 32 may then be set to zero as described heretofore. As in the case of the other movable components of the attachment apparatus, the micrometer is sealed from dirt and dust as by the O-seal ring 31.

The operation of the surface grinder attachment will be evident from the foregoing description. When it is desired to effect an outside diameter grinding operation, the workpiece is first positioned between the dead centers 15 and 19. To this end, the screw lock such as 38 as shown in Figure 2 may be loosened to enable the tail stock body 14 to be moved back and forth along the guide bars 22 and 23 to a position such that the dead centers 15 and 19 are separated by approximately the length of the workpiece. The lock screws such as the lock screw 38 are then tightened. The retracting handle 45 may then be swung rearwardly to retract the tail stock dead center 15 and the workpiece is then positioned between the dead centers 15 and 19. The retracting handle 45 is then released and the spring 41 will bias the dead center 15 toward the dead center 19 and serve to concentrically support the workpiece.

If the work upon which the surface grinding operation is to take place has a tapered portion, it is a simple matter to reposition the sine plate 11 with respect to the base plate 10 as by the micrometer screw and co-operating gauge blocks as already described. After the work is properly positioned, the motor 16 is started and a proper speed selected as by the gear shift lever G of Figure 1. This speed is transmitted to the non-concentric output shaft 55 and drive gear 57 shown in Figure 3. Rotation of this gear in turn will rotate the driving plate 18 through the internal ring gear 58. As mentioned heretofore, rotation of the drive plate 18 is communicated to the workpiece by means of the driving screw 68 and driving dog 67 illustrated in Figure 3.

After the particular grinding operation has been completed, it is a simple matter to retract the lever 45 and release the workpiece from between the dead centers 15 and 19.

If desired, the driving plate can be employed to support a suitable face plate to enable face plate grinding operations to be carried out.

From the foregoing description, it will be evident that not only are grinding operations greatly facilitated by means of the present grinder attachment, but further, the necessity of building up complicated jigs and the like for supporting workpieces is wholly avoided by the incorporation of the built in micrometer. Further, the provision of bellows and the other annular seals described, insures relatively long lived operations of the attachment as well as minimizing maintenance thereon.

Because of the extreme accuracy afforded by the use of dead centers as well as the inherent accuracy resulting from a built in micrometer as described, the grinder attachment is also very useful as a checkout and inspection instrument for checking both concentricity and taper angles.

While only a preferred embodiment of the invention has been described and set forth, it is to be understood that many variations thereof that fall within the scope and spirit of the present invention will occur to those skilled in the art. The surface grinder attachment apparatus is, therefore, not to be thought of as limited to the specific embodiment set forth for illustrative purposes.

What is claimed is:

1. A surface grinder attachment comprising, in combination: a base plate adapted to seat on the work table of said surface grinder; a sine plate; first and second sine bars running transversely under said sine plate adjacent its ends to support said sine plate above and in substantially parallel relationship to said base plate; a head stock body and tail stock body including respectively first and second dead centers mounted in opposing relationship on said sine plate; a drive plate on said head stock body; a motor for rotating said drive plate about said first dead center; bracket means secured to said base plate and journaling the opposite ends of one of said sine bars so that said sine plate is free to swing about the axis of said bar out of said parallelism with said base plate; and micrometer means between adjacent end portions of said base plate and sine plate for moving said sine plate out of parallelism with said base plate, said micrometer means including a threaded bushing in the upper surface of said base plate; a micrometer screw anvil threaded into said bushing and having a flat upper surface engaging the underside of the other of said sine bars; an annular dial secured to said screw anvil; and a pointer coupled to said bushing adjacent to said dial, whereby a workpiece positioned between said dead centers is held at a desired angle.

2. The subject matter of claim 1, in which said head stock body includes a reduced diameter nose portion supporting said first dead center, said drive plate having a central opening receiving said nose portion and a ring gear on the inner circumferential portion of said opening; a nonconcentric driving shaft coupled to said motor and including a driving gear meshing with said ring gear; ball bearings between the external surface of said nose portion and the internal surface of said opening in said drive plate; and annular seals between said nose portion and said drive plate for excluding dirt and grit from the interior thereof.

References Cited in the file of this patent

UNITED STATES PATENTS

| | | |
|---|---|---|
| 2,223,888 | Harley | Dec. 3, 1940 |
| 2,428,248 | Strong | Sept. 30, 1947 |
| 2,505,928 | Worby | May 2, 1950 |
| 2,583,363 | Durland | Jan. 22, 1952 |
| 2,645,026 | Trbojevich | July 14, 1953 |
| 2,706,872 | Flanders et al. | Apr. 26, 1955 |
| 2,746,218 | Bowie et al. | May 22, 1956 |
| 2,765,538 | Field et al. | Oct. 9, 1956 |
| 2,771,821 | Beusch | Nov. 27, 1956 |
| 2,869,242 | Dwyer | Jan. 20, 1959 |